UNITED STATES PATENT OFFICE.

WILLIAM B. BRITTINGHAM, OF LAFAYETTE, INDIANA.

IMPROVEMENT IN TANNING AND STUFFING LEATHER.

Specification forming part of Letters Patent No. 98,916, dated January 18, 1870; Reissue No. 4,129, dated September 27, 1870.

*To all whom it may concern:*

Be it known that I, WILLIAM B. BRITTINGHAM, of Lafayette, in the county of Tippecanoe and State of Indiana, have invented an Improved Process of Tanning and Stuffing Leather; and I do hereby declare that the following is a full, clear, and exact description thereof, enabling persons skilled in the art to reduce it to practice.

The tanning compounds heretofore used for treating raw hides have invariably had some ingredients in them which affected injuriously the gluten in the hides, and thus impaired the elasticity, as well as the tenacity, of the leather, and where the tanned hides are stuffed the compounds used for that purpose have failed to accomplish the permanent pliability and softness of the leather, which are so essential qualities in a fine article.

It is the object of my invention to provide a compound for tanning the hides, which shall leave the gluten therein to a great extent unimpaired, and another compound for stuffing the tanned hides, which contains, as one of the ingredients, glycerine, by which the permanent softness and pliability of the leather are insured.

The first part of my process consists in treating the hides with a compound composed of the following ingredients, in about the proportions given, viz: nitrate of potassa, four ounces; alum, two ounces; terra-japonica, two ounces; sulphuric acid, two drams; distilled water, two quarts.

In preparing this compound, the nitrate of potassa, alum, and terra japonica are first dissolved in the water, after which the sulphuric acid is added. The hides are soaked in this compound from five to ten days They are then taken out to be stuffed, and for this part of my process I use glycerine, in connection with tallow or any of the fixed oils, in the proportion of from one ounce to twelve ounces of glycerine to one pound of tallow, according to the kind of leather to be manufactured, to which a sufficient quantity of any of the fixed oils may be added to make the composition of the proper consistency to be applied to the leather.

This compound is prepared by placing the different substances named in a kettle and subjecting them to a proper degree of heat to effect a perfect union of them. Thus prepared, it is spread upon all sides of the hides, which are then hung up to dry, the whole process being completed in about fifteen days.

The advantages resulting from the use of this composition for stuffing leather are that it makes the leather more firm, of a closer fiber, and yet leaves it more mellow, presenting a smooth surface when cut, and retaining its elasticity and softness until it is worn out, the glycerine remaining therein for any length of time without evaporating.

I am aware that tanning compounds are in use in which some or all of the ingredients are used which I employ; but I have found, by actual experiments, that no other combination of these ingredients than that above given will produce the result at which I have aimed—namely, to tan the hides without destroying the gluten in them, and thus retaining the strength of the raw hides, while converting them into pliable leather.

What I claim as my invention, and desire to secure by Letters Patent, is—

1. In the process of stuffing leather, the use of a compound composed of glycerine and tallow, with or without any of the fixed oils, substantially as set forth.

2. The process of tanning and stuffing leather herein set forth, by first treating the raw hides with a compound composed of the ingredients and in the proportions specified, and afterward stuffing the tanned hides by another compound composed of such ingredients as herein described.

In testimony whereof I have signed the foregoing specification in the presence of two subscribing witnesses.

WILLIAM B. BRITTINGHAM.

Witnesses:

D. P. HOLLOWAY,

B. EDW. J. EILS.